United States Patent [19]

Hakamada et al.

[11] Patent Number: 4,774,582
[45] Date of Patent: Sep. 27, 1988

[54] PICTURE-IN PICTURE TELEVISION RECEIVER WITH STEP-BY-STEP STILL PICTURE CONTROL

[75] Inventors: Kunio Hakamada, Tokyo; Satoshi Inashima, Saitama; Makoto Hiyamizu, Tokyo, all of Japan

[73] Assignee: Sony Corporation, Tokyo, Japan

[21] Appl. No.: 944,463

[22] Filed: Dec. 19, 1986

[30] Foreign Application Priority Data

Dec. 28, 1985 [JP] Japan .................. 60-297329

[51] Int. Cl.$^4$ ........................... H04N 5/262
[52] U.S. Cl. ...................... 358/183; 358/182; 358/22; 358/903
[58] Field of Search ............... 358/183, 22, 182, 903

[56] References Cited

U.S. PATENT DOCUMENTS

| | | | |
|---|---|---|---|
| 3,911,420 | 10/1975 | Lampson | 340/324 A |
| 3,943,280 | 3/1976 | Kimura et al. | 358/183 |
| 4,070,695 | 1/1978 | Scholz et al. | 358/181 |
| 4,139,860 | 2/1979 | Micic et al. | 358/183 |
| 4,172,264 | 10/1979 | Taylor et al. | 358/185 |
| 4,238,773 | 12/1980 | Tsuboka et al. | 358/183 |
| 4,249,213 | 2/1981 | Imoide et al. | 358/183 |
| 4,266,242 | 5/1981 | McCoy | 358/22 |
| 4,267,560 | 5/1981 | Ishikawa et al. | 358/22 |
| 4,278,993 | 7/1981 | Suzuki | 358/22 |
| 4,612,569 | 9/1986 | Ichinose | 358/22 |
| 4,623,915 | 11/1986 | Bolger | 358/22 |
| 4,636,864 | 1/1987 | Annegarn et al. | 358/191.1 |
| 4,665,438 | 5/1987 | Miron et al. | 358/183 |
| 4,673,983 | 6/1987 | Sarugaku et al. | 358/183 |
| 4,680,622 | 7/1987 | Barius et al. | 358/22 |
| 4,682,234 | 7/1987 | Naimpally | 358/183 |
| 4,694,343 | 9/1987 | Flora | 358/183 |
| 4,694,344 | 9/1987 | Flora | 358/183 |
| 4,698,664 | 10/1987 | Nichols et al. | 358/22 |

FOREIGN PATENT DOCUMENTS

| | | |
|---|---|---|
| 2822785 | 7/1978 | Fed. Rep. of Germany . |
| 31-27573 | 6/1956 | Japan . |
| 35-47792 | 1/1960 | Japan . |
| 54-34618 | 3/1979 | Japan . |
| 60-180283 | 9/1985 | Japan . |

OTHER PUBLICATIONS

TV Receiver Puts Two Pictures on Screen at Same Time, by Manfred Ullrich and Max Hegendoerfer, Electronics/Sep. 1, 1977.
Fully Digitalized Color Picture in Picture Television System, by Michio Masuda et al., IEEE Transactions on Consumer Electronics, vol. CE-25, Feb. 1979.

Primary Examiner—James J. Groody
Assistant Examiner—John K. Peng
Attorney, Agent, or Firm—Philip M. Shaw, Jr.

[57] ABSTRACT

A television receiver of the type which simultaneously displays a main, live picture and one or more sub-pictures inset therein and which is provided with a step-by-step switch and associated circuitry which allows the user to operate the step-by-step switch and either display the main, live picture and as sub-pictures, a series of still pictures taken at different points in time from the main picture, or the main, live picture and as sub-pictures a series of still pictures taken at different points in time from a second video signal along with a live sub-picture of the second video signal.

8 Claims, 3 Drawing Sheets

4,774,582

PICTURE-IN PICTURE TELEVISION RECEIVER WITH STEP-BY-STEP STILL PICTURE CONTROL

FIELD OF THE INVENTION

The present invention relates generally to a socalled picture-in-picture type television receiver in which a sub-picture screen is inset into a main picture screen in a picture-in-picture fashion.

DESCRIPTION OF THE PRIOR ART

In a television receiver of the so-called picture-in-picture type, a plurality of still pictures taken at different times from a picture on a main picture screen are inset into the main picture screen in a picture-in-picture fashion. Such a receiver is disclosed in, for example, Japanese laid-open patent application No. 56-27573.

OBJECTS AND SUMMARY OF THE INVENTION

Accordingly, it is an object of this invention to provide an improved picture-in-picture type television receiver.

It is another object of this invention to provide a television receiver of a so-called picture-in-picture type in which according to the presence or absence of a sub-picture, both the main picture and sub-still pictures can be reproduced easily in a step-by-step picture fashion by operating a step-by-step switch.

According to one aspect of the present invention, there is provided a television receiver comprising:

(a) a cathode ray tube having a picture screen which is divisible into a main picture screen and one or more sub-picture screens inset into the main picture screen;

(b) a main picture circuit for supplying a first video signal for the main picture screen video signal;

(c) a video signal processor circuit having a memory and including means for selecting one video signal from among said first video signal and a second video signal, and for forming from the selected video signal a sub-picture video signal for one or more of said sub-picture screens inset into the main picture screen of said cathode ray tube;

(d) a composing circuit connected to the video signal processor circuit and the main picture circuit for composing the first video signal and said sub-picture video signal into a composite signal which is supplied to the cathode ray tube;

(e) a system control circuit for controlling said main picture circuit, said video signal processor circuit and said composing circuit; and (f) a step-by-step picture switch means, connected to the system control circuit, for supplying a step-by-step picture command signal to said system control circuit, wherein when said step-by-step picture switch means is operated, if only said first video signal is supplied to said composing circuit, said first video signal is supplied to said video signal processor circuit to form a plurality of still picture signals taken at different times from said first video signal, and said first video signal and said plurality of still picture signals taken from said first video signal are supplied to said composing circuit, but if when said step-by-step picture switch means is operated, said composing circuit is supplied with said first video signal and said second video signal as said sub-picture video signal, said second video signal is supplied to said video signal processor circuit to form a plurality of still picture signals taken at different times from said second video signal, and said first video signal and said plurality of still picture signals taken from said second video signal are supplied to said composing circuit.

According to the television receiver of the present invention, on the basis of the presence or absence of the sub-picture, both the main picture and the sub-still pictures can be easily reproduced in a step-by-step picture fashion by operating the step-by-step picture switch.

These and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

An embodiment of a television receiver according to the present invention will now be described with reference to the attached drawings.

Figure 1:
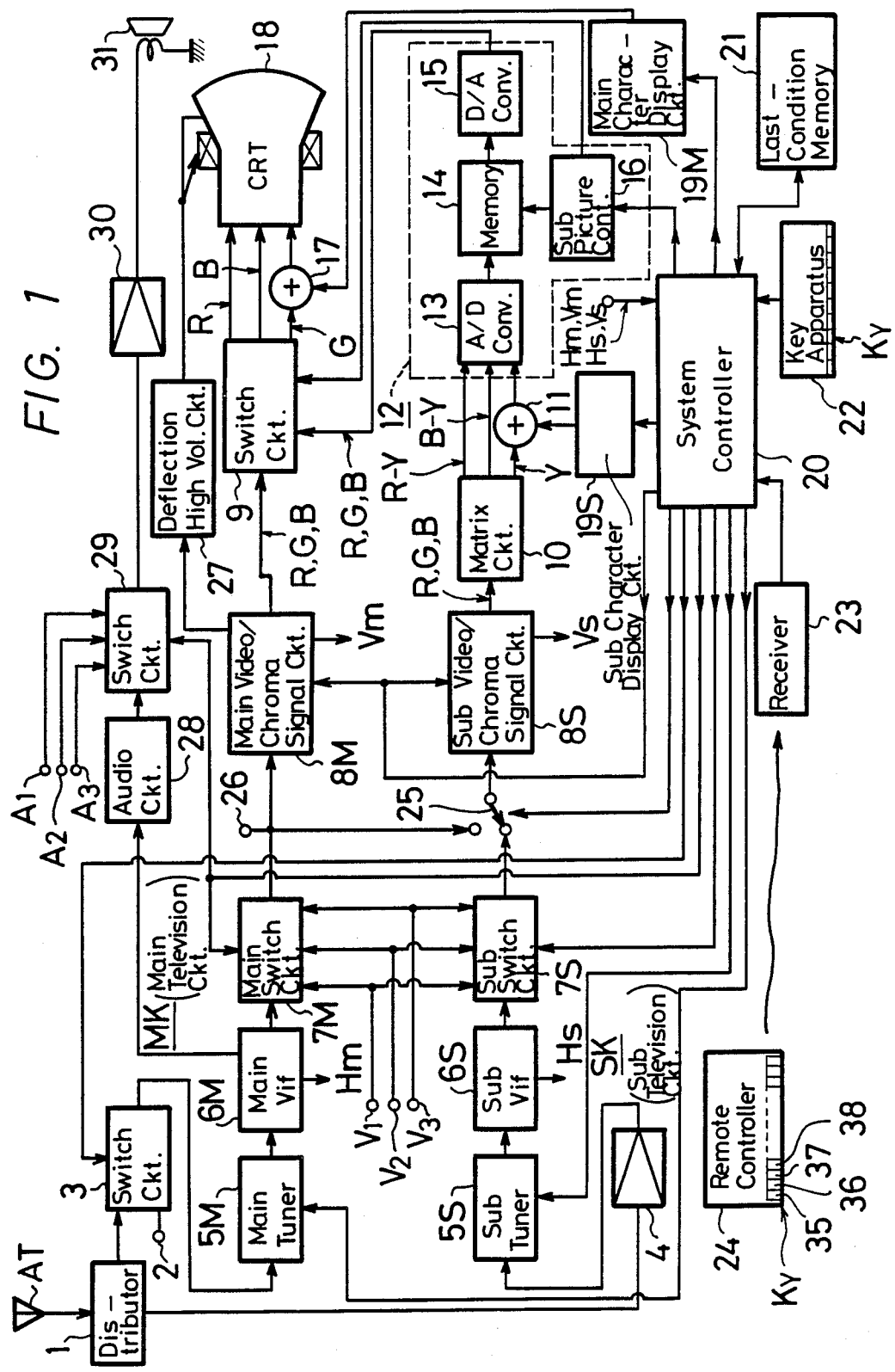
FIG. 1 is a block diagram showing an embodiment of a television receiver according to the present invention.

FIG. 1 is a block diagram showing an overall circuit arrangement of one embodiment of the television receiver according to the present invention.

Referring to FIG. 1, the television receiver of this invention includes a main television circuit MK and a sub-television circuit SK. From a video signal supplied by the main television circuit MK, a main picture is displayed on the whole picture screen of a cathode ray tube 18, whereas from a video signal supplied by the sub-television circuit SK, a sub-picture is displayed on one portion of the main picture screen in such a manner that the sub-picture is inset into the main picture. These main and sub-television circuits MK and SK include main and sub-tuners 5M, 5S, main and sub-video intermediate frequency circuits 6M, 6S and main and sub-video/chroma signal circuits 8M, 8S, respectively.

Further, the television receiver of the invention is provided with external video signal input terminals V1, V2 and V3 to which reproduced video signals (base band signals) from a VTR (video tape recorder) or the like are supplied. The video signals from these external input terminals V1, V2 and V3 can be selectively switched in place of the video signals from the tuners 5M and 5S by the main and the sub-switching circuits 7M and 7S provided in the television circuits MK and SK. The signal selected by the switching circuit 7M is then supplied to the cathode ray tube 18 to be displayed on its picture screen.

The sub-television circuit SK also includes a video signal processor circuit 12 for displaying the sub-picture on the picture screen of the cathode ray tube 18. The video signal processor circuit 12 controls the kinds of sub-pictures, such as, a live picture, a still picture, a step-by-step picture or the like, the number of sub-pictures, the position of the sub-picture on the main picture screen, etc. By "live" picture is meant that the displayed image is animated rather than static.

Figure 3A:
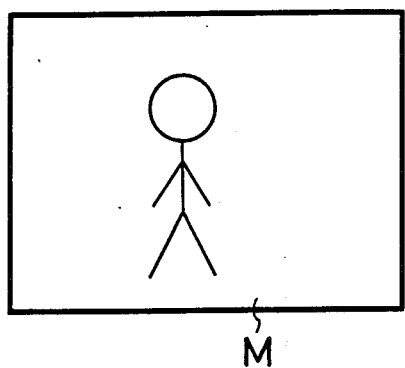
FIGS. 3A to 3D are schematic representations respectively used to explain the pictures displayed according to the embodiment shown in FIG. 1.
Figure 3B:
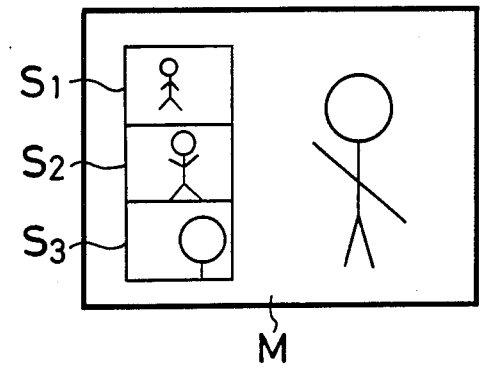
Figure 3C:
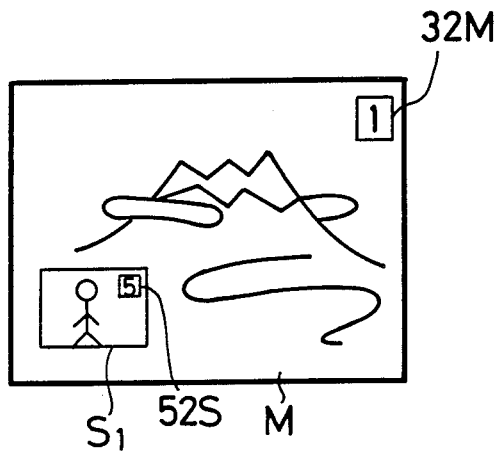

The main and sub-television circuits MK and SK are respectively provided with main and sub-character display circuits 19M and 19S to display picture discriminating indications 32M, 32S, respectively, such as the reception channel of a television broadcast or the ordinary number of the external video signal input terminals, for example, on the respective main picture screen and the sub-picture screen in a inset into fashion as shown in FIG. 3C.

There is provided a control circuit 20 which includes a micro-computer. The respective sections of the television receiver are controlled by this system control circuit 20 as will be explained in greater detail hereinafter.

Next, the circuit arrangement of the television receiver according to this invention will be described more fully. A television broadcast signal received by an antenna AT is supplied to a distributor 1. The distributor 1 supplies the received signal through a switching circuit 3 to the main tuner 5M without substantially attenuating the same and also supplies a portion of the received signal to the sub-tuner 5S. The received signal to be applied to the sub-tuner 5S is first amplified by a high frequency amplifier 4. The switching circuit 3 selectively switches between the antenna input signal from the distributor 1 and a high frequency input signal from a descrambler used for receiving a cable television broadcast or the like from an auxiliary input terminal 2 and supplies one of them to the main tuner 5M.

The video signal from the main tuner 5M is supplied to the main video intermediate frequency circuit 6M. Then, the video intermediate frequency signal therefrom is supplied to the main switching circuit 7M which can be selectively switched between this video signal and the external video signals from the external video input terminals V1 to V3. The signal selected by the switching circuit 7M is supplied to the main video/chroma signal circuit 8M. A monitor output terminal 26 is connected to the output side of the main switching circuit 7M. From this main video/chroma signal circuit 8M, there are generated red, green and blue color signals R, G and B which are then fed to a switching circuit 9.

The audio intermediate frequency signal from the main video intermediate frequency circuit 6M is supplied to an audio circuit (incorporating therein a second multiplexing decoder circuit) 28. The audio signal from the audio circuit 28 is supplied to a switching circuit 29 which can be selectively switched between this audio signal and the external audio signals reproduced from the VTR and the like and supplied thereto from external audio signal input terminals A1, A2 and A3, respectively, corresponding to the above mentioned external video signal input terminals V1, V2 and V3. The audio signal selected by the switching circuit 29 is supplied through a low frequency amplifier 30 to a loudspeaker 31.

The horizontal and vertical synchronizing signals from the main video/chroma signal circuit 8M are supplied to a deflection/high voltage circuit 27. The deflection signal and the high DC voltage from the circuit 27 are supplied to the cathode ray tube 18.

The video signal from the sub-tuner 5S is supplied to the sub-video intermediate frequency circuit 6S. The video intermediate frequency signal therefrom is supplied to the sub-switching circuit 7S which selectively switches between this video signal and the external video signals from the external video signal input terminals V1 to V3. A switch 25 selects between video signals selected by the switching circuit 7S and the video signal from the main switching circuit 7M and supplies the chosen video signal to the sub-video/chroma signal circuit 8S. From this sub-video/chroma signal circuit 8S, there are derived red, green and blue color signals R, G and B. These red, green and blue color signals R, G and B are supplied to a matrix circuit 10 in which they are converted to a luminance signal Y and red and blue color difference signals R-Y and B-Y, respectively, which are then fed to an A/D (analog-to-digital) converter 13 in the video signal processor circuit 12.

The A/D converter 13 is a time division type A/D converter as disclosed, for example, in Japanese published patent application No. 60-47792. The digital signal from the A/D converter 13 is supplied to a memory 14 and then written therein. The digital signal read out from the memory 14 is supplied to a D/A (digital-to-analog) converter 15 and is thereby converted to an analog signal. In the video signal processor circuit 132, sampling lines and picture elements of the video signal are selected and other lines and picture elements are thrown away or removed in correspondence to the ratio between the sizes of the main picture screen and the sub-picture screen. The memory 14 has frame (or field) memory areas corresponding to the maximum number of displayable sub-pictures, for example, four frame memory areas. This memory 14 is controlled by a sub-picture control circuit 16 so as to specify the kinds of sub-pictures, such as, a live picture, a still picture, a step-by-step picture and so on, the number of sub-pictures, the position of the sub-picture on the main picture and the like.

When the sub-picture is made as a live, i.e. a real moving picture, the video signal is alternately written in and read out from the memory 14 continuously and repeatedly; when the sub-picture is made as a still picture, the video signal is written in the memory 14 for a selected frame or field period and then read out from the memory 14 repeatedly; and when the sub-picture is made as a step-by-step picture, a plurality of video signals are written in the memory 14 at different times corresponding to different frames or field periods and then read out therefrom repeatedly (see Japanese laid-open patent application No. 57-27573). The number of the sub-picture screens inset into within or on the main picture screen is determined on the basis of the number of memory areas in the memory 14 used. The contents or pictures of the sub-picture screen can be a real moving picture, a still picture or a step-by-step picture based on the video signal from the subvideo/chroma signal circuit 8S or on the video signal from the main video/chroma signal circuit 8M. The switching of these video signals is carried out by the above mentioned switch 25. The picture contents on the main picture screen and the sub-picture screen can be exchanged with each other by simultaneously switching the reception channels of the main and sub-tuners 5M and 5S or by simultaneously switching the main and subswitching circuits 7M and 7S.

The respective color signals from the main/video chroma signal circuit 8M and the respective color signals from the D/A converter 15 are supplied to the switching circuit 9 in which both groups of respective color signals are switched at appropriate timing intervals such that the sub-picture screen is inset into one portion of the main picture screen at a selected, predetermined position. This switching circuit 9 is controlled by the sub-picture control circuit 16, which is controlled by the system controller 20. The video signal from the switching circuit 9 is supplied to the cathode ray tube 18.

The main picture discrimination indicating signal, such as a signal indicative of the main channel number, is formed by the main character display circuit 19M and is added to the video signal by an adder 17 connected between the switching circuit 9 and the cathode ray tube 18. In this example, the adder 17 is interposed only in the transmission path of the green color signal G to thereby superimpose a green picture discrimination indication upon the main picture screen. It is of course possible that this picture discrimination indication can be made by using other colors.

The sub-picture discrimination indicating signal, formed by the sub-character display circuit 19S and which could be indicative of the channel number selected by the sub-tuner 5S, for example, is added to the sub-video signal by an adder 11 connected between the matrix circuit 10 and the A/D converter 13. In this example, an adder 11 is interposed only in the transmission path of the luminance signal Y to thereby superimpose a white picture discrimination indication on the sub-picture screen. Also, it is possible that this picture discrimination indication can be made by using other colors.

The channel selections in the above mentioned main tuner 5M and sub-tuner 5S are carried out by channel selection signals from the system control circuit 20. The switching circuits 3, 7M, 7S, 29 and the switch 25 are also selectively switched under the control of the system control circuit 20. The main and subvideo/chroma signal circuits 8M and 8S are subjected to blanking by the system control circuit 20 for a short period upon the up and down scanning channel selection operation. Alternatively, this blanking may be carried out by a blanking switch that is provided at the prestage of the cathode ray tube 18. Further, main and sub-horizontal synchronizing signals Hm and Hs from the main and sub-video intermediate frequency circuits 6M and 6S and main and sub-vertical blanking signals (vertical signals) Vm and Vs from the main and subvideo/chroma signal circuits 8M and 8S are supplied to the system control circuit 20. The main picture and sub-picture discrimination indicating signal circuits 19M and 19S and the sub-picture control circuit 16 are controlled by the system control circuit 20.

A last-condition memory 21 is provided which stores, under the control of the system control circuit 20, the selected channels of the main and sub-tuners 5M and 5S, the switch conditions of the switching circuits 7M and 7S, the control conditions of the sub-picture control circuit 16 and so on when the power of the television receiver is turned off. When the television receiver is powered on again, the conditions of the respective circuits presented when the power of the television receiver was last turned off are reproduced under the control of the system control circuit 20.

A key apparatus 22 is connected to the system control circuit 20 and is provided with various kinds of keys KY to control the television receiver.

Reference numeral 24 denotes a remote controller (commander) which is also provided with various kinds of keys KY to control the television receiver. This remote controller 24 is also provided with a transmitter (not shown) to transmit a remote control signal based on the corresponding key operation. A receiver 23 for receiving the signal transmitted from the transmitter of the remote controller 24 is connected to the system control circuit 20. The remote control signal can be transmitted by means of a light beam, radio wave, sound wave and so on.

By way of example, the keys KY of the key apparatus 22 or the remote controller 24 will be enumerated as follows: a power key; a recall key (used to display the picture discrimination indication such as the channel number); a mute key (used to mute the sound); ten keys used to select the reception channel and the number of the external video signal input terminal; a TV (television)/VTR change-over key; an antenna input/auxiliary high frequency input changeover key; a sound multiplexing key; up and down keys for incrementing and decrementing the contrast of luminance and chrominance signals, the main reception channels, and the number of the main external video signal input terminal, and the sound volume respectively; an on-off key for the sub-picture screen; up and down keys for incrementing and decrementing the sub-reception channel and the number of the sub-external video signal input terminal; a still picture key 35; a step-by-step picture key 36; a shift key 37 used to shift the position of the sub-picture screen; and a main-sub-exchange key 38 used to exchange the picture contents on the main picture and sub-picture screens.

The function of the system control circuit 20 in reproducing the picture in a step-by-step manner will now be described with reference to a flow chart of FIG. 2 and explanatory diagrams of FIGS. 3A to 3D.

Figure 2:
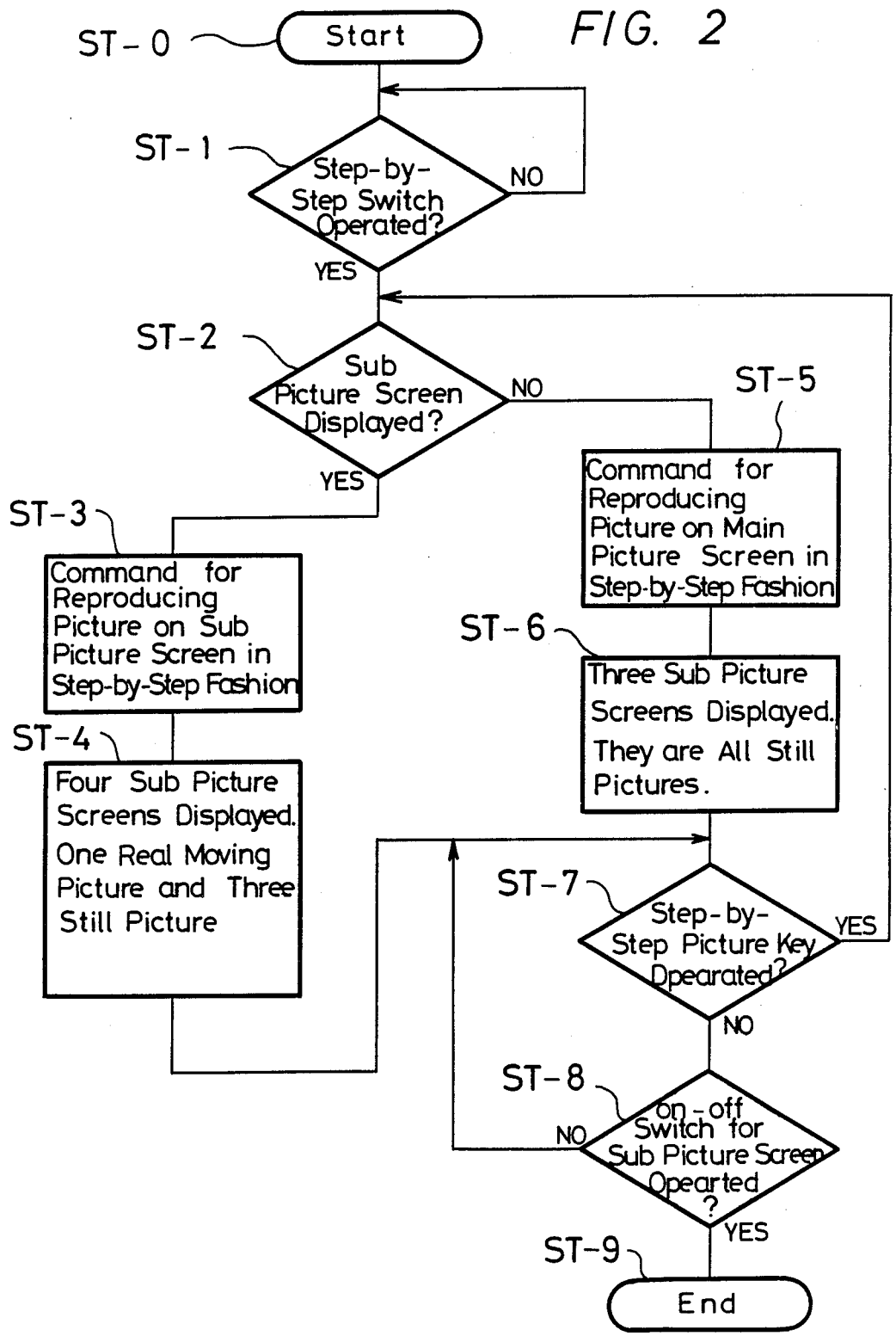
FIG. 2 is a flow chart to which a reference will be made in explaining the function of the embodiment according to the present invention shown in FIG. 1.

Referring to the flow chart of FIG. 2, a routine followed by the system control circuit 20 for reproducing the picture in a step-by-step fashion begins with step ST-0. For example, when the step-by-step picture key 36 of the remote controller 24 (FIG. 1) is depressed by the viewer to operate the step-by-step picture switch, the fact that this step-by-step switch is operated is detected at step ST-1 and then the program goes to step ST-2. At step ST-2, the system control circuit 20 determines whether or not the sub-picture screen is displayed.

When only the video signal from the main video/chroma signal circuit 8M is supplied to the switching circuit 9 shown in FIG. 1, only a main picture screen (real moving picture) M is displayed on the picture screen of the cathode ray tube 18 as shown in FIG. 3A, but not the sub-picture. At that time, at step ST-5, a command for reproducing a picture displayed on the main picture screen in a step-by-step picture fashion is issued from the system control circuit 20, causing the video signal from the main switching circuit 7M to be selected by the switch 25 and supplied to the sub-video/chroma signal circuit 8S. The R, G, B video signal output from the sub-video/chroma signal circuit 8S is supplied to the video signal processor circuit 12 which forms three still picture signals taken at different times. The three still picture signals and the video signal from the main video/chroma signal circuit 8M are supplied to the switching circuit 9 and are thereby composed. The thus composed video signal is supplied to the cathode ray tube 18. Accordingly, as shown in FIG. 3B, a step-by-step picture composed of sub-picture screens $S_1$, $S_2$ and $S_3$ of the three still pictures taken at different times from the main picture video signal is displayed on, for example, the left-hand side of the main picture screen (real moving picture) M in the vertical direction in a picture-in-picture fashion (at step ST-6).

Figure 3D:
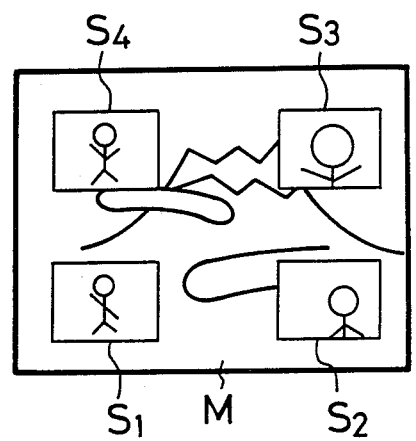

However, when the switching circuit 9 is being supplied with the video signal from the main video/chroma signal circuit 8M and a live, sub-picture screen video signal from the video signal processor circuit 12, the main picture screen (real moving picture) M and the sub-picture screen (real moving picture) $S_1$ are displayed on the picture screen of the cathode ray tube 18 as shown in FIG. 3C. If, at that time, at step ST-3, a command for reproducing the picture on the sub-picture screen in the step-by-step manner is issued from the system control circuit 20, the video signal from the sub-switching circuit 7S is selected by the switch 25 and is supplied to the sub-video/chroma signal circuit 8S. Then, the video signal output from the sub-video/chroma signal circuit 8S is supplied to the video signal processor circuit 12 which generates a video signal (real moving picture signal) for the sub-picture screen and three still picture signals taken at different times from the real, moving, sub-picture video signal. Thereafter, this video signal (real moving picture signal) for the sub-picture screen, the three still picture signals and the video signal from the main video/chroma signal circuit 8M are supplied to the switching circuit 9 and are thereby composed. The thus composed signal is then supplied to the cathode ray tube 18. Accordingly, as shown in FIG. 3D, at, for example, four corners of the main picture screen (real moving picture) M, the sub-picture screen $S_1$ (real moving picture) shown in FIG. 3C and three step-by-step still pictures $S_2$, $S_3$, and $S_4$ taken at different times from the real, moving sub-picture screen are displayed in a picture-in-picture fashion (at step ST-4). It is possible to shift the place on the main screen where the real, moving sub-picture screen is located among the four sub-picture screens $S_1$ to $S_4$, taken in this order.

If at step ST-7 the step-by-step picture key 36 of the remote controller 24 is depressed again to operate the step-by-step switch, the program goes back to the step ST-2 in which another step-by-step reproduction can again be carried out at other, different times. At step ST-8, if the on-off switch for turning on and off the sub-picture screen is operated by depressing the on-off key of the remote controller 24 for the sub-picture, the displayed state of the video screen of the cathode ray tube 18 is returned to the main picture screen (real moving picture) M shown in FIG. 3A and hence, the step-by-step reproduction is ended.

Furthermore, since the locations of the plurality of sub-picture screens in the step-by-step reproducing mode are made different as shown in FIGS. 3B and 3D upon the step-by-step reproduction of the picture of the main picture screen and the step-by-step reproduction of the picture of the sub-picture screen, the step-by-step reproduction of the main picture screen and the step-by-step reproduction of the sub-picture screen can easily be visually discriminated from each other.

According to the present invention as set forth above, it becomes possible to have a television receiver in which in accordance with the presence or absence of the sub-picture screen, the pictures of both the main picture and sub-picture screens can be easily reproduced in a step-by-step fashion by operating the step-by-step picture switch.

The above description is given for a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. A television receiver comprising:
    (a) a cathode ray tube having a picture screen which is divisible into a main picture screen and one or more sub-picture screens inset into the main picture screen;
    (b) a main picture circuit for supplying a first video signal for the main picture screen video signal;
    (c) a video signal processor circuit having a memory and including means for receiving a second video signal from an external source and means for selecting one video signal from among said first video signal and said second video signal, and for forming from the selected signal a sub-picture video signal for one or more sub-picture screens inset into the main picture screen of said cathode ray tube;
    (d) a composing circuit connected to the video signal processor circuit and the main picture circuit for composing the first video signal and said sub-picture video signal into a composite signal which is supplied to the cathode ray tube;
    (e) a system cathode circuit for controlling said main picture circuit, said video signal processor circuit and said composing circuit; and
    (f) step-by-step picture switch means, connected to the system control circuit, for supplying a step-by-step picture command signal to said system control circuit, wherein when said step-by-step picture switch means is operated, if only said first video signal is supplied to said composing circuit, said system control circuit causes said first video signal to be supplied to said video signal processor circuit to form a plurality of still picture signals taken at different times from said first video signal, and said first video signal and said plurality of still picture signals taken from said first video signal are supplied to said composing circuit, but if when said step-by-step picture switch is operated, said composing circuit is supplied with said first video signal and a subpicture video signal corresponding to said second video signal, said system control circuit causes said second video signal to be supplied to said video signal processor circuit to form a plurality of still picture signals taken at different times from said second video signal, and said first video signal and a sub-picture video signal corresponding to said plurality of still picture signals taken from said second video signal are supplied to said composing circuit.

2. A television receiver as claimed in claim 1, wherein said video processing circuit causes pictures corresponding to said plurality of still picture signals taken at different times from said first video signal to be reproduced on a plurality of sub-picture screens inset into said main picture screen of said cathode ray tube in a step-by-step fashion.

3. A television receiver as claimed in claim 2, wherein the number of said sub-picture screens is three.

4. A television receiver as claimed in claim 3, wherein said three sub-picture screens are located in the vertical direction near one side of said main picture screen.

5. A television receiver as claimed in claim 1, wherein pictures corresponding to said plurality of still picture signals taken at different times from said second video signal are reproduced on a plurality of sub-picture screens inset into said main picture screen of said cathode ray tube in a step-by-step fashion.

6. A television receiver as claimed in claims 3 or 5, wherein the number of said sub-picture screens on which still pictures are displayed is three.

7. A television receiver as claimed in claim 6, wherein said three sub-picture screens are located at three corners of said main picture screen.

8. A television receiver as claimed in claim 5, wherein the number of sub-picture screens is four and a picture on one of said four sub-picture screens is a live picture signal.

* * * * *